June 19, 1956
Z. J. YORK
2,751,177
NON-SPILL HOLDER FOR BASKETS OR THE LIKE
Filed May 14, 1953
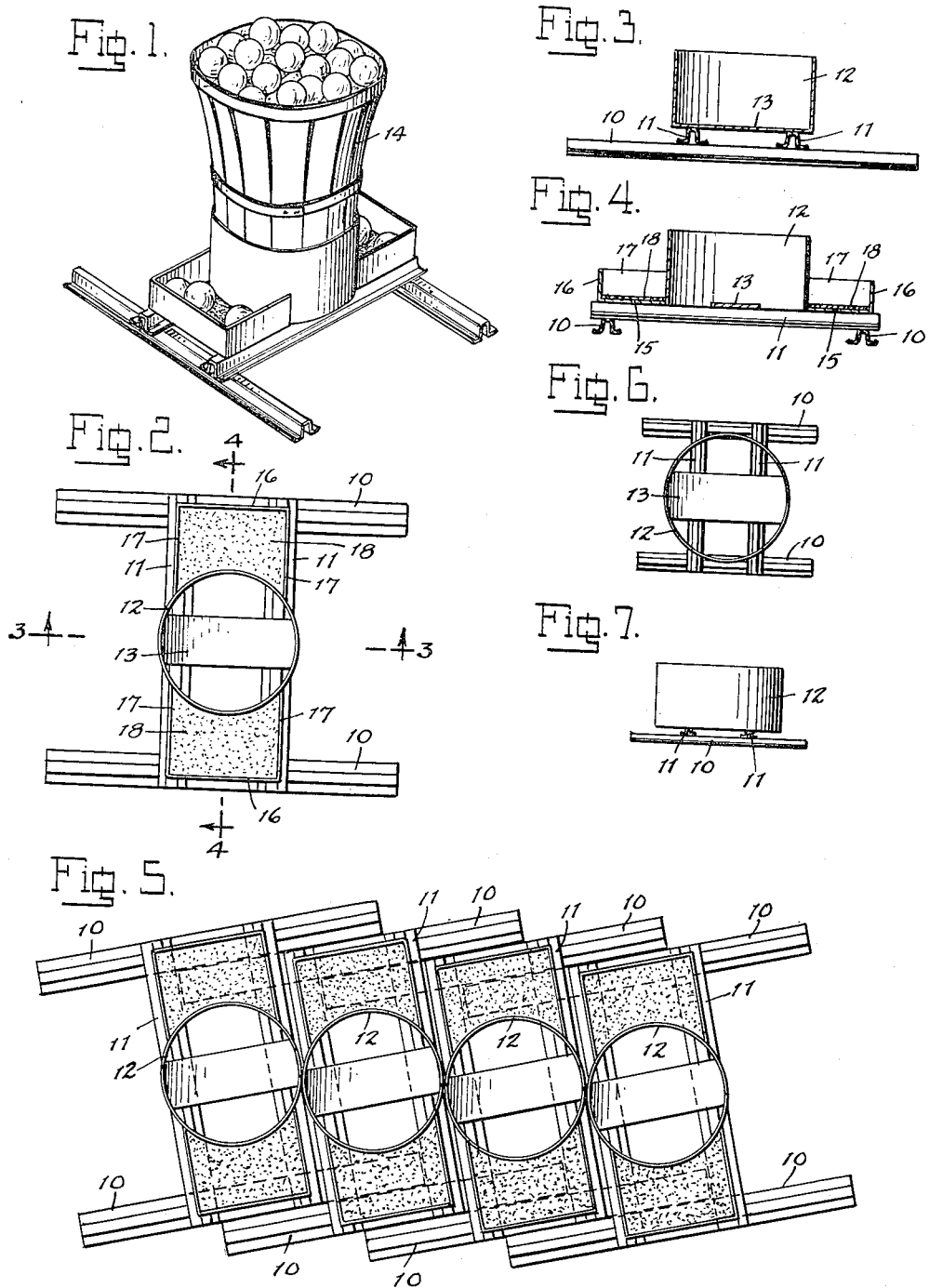
INVENTOR
ZIGMUND J. YORK
BY
ATTORNEY.

United States Patent Office 2,751,177
Patented June 19, 1956

2,751,177
NON-SPILL HOLDER FOR BASKETS OR THE LIKE
Zigmund J. York, Milford, Conn.
Application May 14, 1953, Serial No. 354,920
2 Claims. (Cl. 248—146)

The present invention relates to a non-spill holder for peach baskets or the like, and has for an object to provide a device of this character of simple and inexpensive structure, capable of withstanding hard usage, resistant to deterioration from exposure to weather, and attractive in appearance.

It is particularly proposed to provide a holder in which peach baskets or the like may be placed for the purpose of display, so that the peaches or other fruit or vegetables contained therein will present an attractive appearance, and at the same time the baskets will be protected against overturning and contact with the ground.

A further object is to provide a device which will be convenient to transport manually from place to place, and also which will provide an effectual holding means for peach baskets or the like when the same is being transported in automobiles or trucks. In this latter connection, the invention will prove desirable as an automobile accessory by persons who are in the habit of purchasing baskets of fruit in the country and transporting them to their homes in automobiles.

To the end of providing a holder of this character which will withstand rough handling as well as exposure to weather, it is particularly proposed to construct the holder of aluminum or similar light metal which is not subject to rust or corrosion, and in which the several component parts may be rigidly connected together by welding, thus providing a substantially one-piece structure.

A further object is to provide, in one form of the invention, means for containing an overflow of fruit, i. e., in the case of a basket piled up with fruit, the fruit at the top may be placed in auxiliary overflow containers for transportation or display purposes.

A further object is to provide a holder structure which will enable a succession of similar holders to be placed in side-by-side interengaging relation, so that while each holder has a substantial ground engaging support against tipping, a succession of holders placed in interengaging relation will occupy a substantially smaller space than would be the case if it were necessary to place the holders in side-by-side non-interengaging relation.

Other objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawing:

Fig. 1 is a perspective view showing a holder according to the invention, with a peach basket or the like inserted therein;

Fig. 2 is a plan view of the holder as shown in Fig. 1;

Fig. 3 is a transverse sectional view taken along the line 3—3 of Fig. 2;

Fig. 4 is a transverse sectional view taken along the line 4—4 of Fig. 2;

Fig. 5 is a plan view, showing a succession of holders arranged in side-by-side interengaging relation;

Fig. 6 is a plan view showing a modified form of the holder in which the auxiliary containers shown in Figs. 1-5 are dispensed with; and Fig. 7 is a side elevation thereof.

Referring to the drawings, and more particularly to Figs. 1-5, the non-spill holder, according to the illustrated exemplary embodiment of the invention shown therein, comprises a substantially H-shaped base frame comprising a pair of side members 10—10 in spaced parallel relation to each other, and a pair of cross members 11—11 in parallel relation to each other and equally spaced from the ends of the side members 10—10. These frame members are preferably in the form of extruded or bent strips of aluminum having a channel cross section shape, preferably including an intermediate inverted U-shaped portion and outwardly extending flange portions at the lower ends of the sides of the U-shaped portion. This shape permits the use of relatively light, thin metal, while at the same time providing substantial longitudinal rigidity and a relatively wide ground-engaging surface.

The ends of the cross members 11—11 are rigidly secured to the upper sides of the side members 10—10 by spot welding, although rivets or screws may be employed, if desired. A cylindrical basket receiving part 12, having a diameter slightly greater than the distance between the upper sides of the two cross members 11, is provided with a flat diametrically disposed strip or plate 13 extending across its lower end as a base, and which serves to provide a base support for the basket 14 when inserted therein, as shown in Fig. 1, while at the same time leaving spaces at each side for water drainage and air circulation through the basket.

The basket receiving part 12 is secured upon the cross members 11—11 substantially centrally thereof, with the base strip 13 extending transversely of the members 11—11, the band portion being spot welded to the upper surfaces of the members 11—11, and the lower edge of the cylindrical wall of the holder being also spot welded at those points where it contacts the upper surfaces of the members 11—11.

Also supported upon the upper sides of the members 11—11 at each side of the holder portion 12, there are provided a pair of auxiliary containers of substantially rectangular shape, each comprising a base wall 15, an outer wall 16, and side walls 17—17, the base wall being circumferentially shaped at its inner edge to conform to the cylindrical wall of the basket receiving part 12 where such edge is secured to the cylindrical wall portion by welding. The inner edges of the side walls 17 are also secured by welding to the cylindrical wall of the part 12 and the base wall 15 is secured by welding to the upper surfaces of the members 11—11. These auxiliary containers provide pockets at each side of the basket receiving part 12 into which surplus fruit may be placed, i. e., fruit taken from the top of the basket which might otherwise spill out. In the base of each of the pockets there is preferably provided a pad 18 of sponge rubber or the like to provide a non-bruising support for the fruit.

As shown in Fig. 5, a series of the holders may be placed in side-by-side interengaging relation, the ends of the side members 10 of one holder engaging beneath the raised cross members 11 of the next holder with the cylindrical basket receiving parts 12 substantially in contact with each other. Thus, while the holders are placed in close relation to each other, each is provided with a substantially wide supporting base provided by the side members 10.

In Figs. 6 and 7 I have illustrated a modified form of the invention in which the cross members 11 project only a slight distance beyond the periphery of the holder portion 12, and the auxiliary side containers are dispensed with. This holder is illustrated as being smaller than the holder illustrated in Figs. 1–5 to receive a smaller basket, and the side members 10—10 and the cross members 11—11 are preferably formed of smaller cross-section strips.

What is claimed is:

1. In a non-spill holder for baskets or the like, a base frame comprising a pair of equal length transversely aligned spaced parallel side strip members of channeled cross-section, a pair of equal length transversely aligned spaced parallel cross strip members of channeled cross-section at right angles to and superimposed upon said side strip members and rigidly secured adjacent their ends upon the upper sides of said side strip members at points equally spaced a substantial distance from the ends of said side strip members, the lower sides of said cross strip members being upwardly offset from the lower sides of said side strip members a distance at least equal to the height of said side strip members whereby a space is provided beneath said cross strip members in which an end of a side strip of a similar holder may be inter-engaged, and a basket receiving part comprising a cylindrical wall having a diameter substantially greater than the width of the space between said spaced cross strip members and substantially less than the lengtth of said cross strip members, its lower circular edge being engaged with and rigidly secured upon the upper sides of said cross strip members, and its vertical axis being centrally disposed between both said side strip members and said cross strip members, the cylindrical wall being substantially spaced inwardly from the ends of said side strip members, whereby when a plurality of the holders are placed in side-by-side relation the walls of adjacent holders may contact each other while an end portion of one side strip member of one holder is received beneath a cross strip member and against a side strip member of an adjacent holder.

2. The invention as defined in claim 1, further characterized in that a diametrically disposed strip is fixedly connected at its ends to said cylindrical wall and spaced at its side edges therefrom and disposed transversely of said cross strip members with its end portions engaged with the upper sides thereof.

References Cited in the file of this patent

UNITED STATES PATENTS

| | | |
|---|---|---|
| 435,023 | Robinson | Aug. 26, 1890 |
| 674,217 | Rettinger | May 14, 1901 |
| 1,051,107 | Hedrick | Jan. 21, 1913 |
| 1,138,141 | Oliver | May 4, 1915 |
| 1,564,131 | Dunlap | Dec. 1, 1925 |
| 1,602,283 | Noble et al. | Oct. 5, 1926 |
| 1,957,263 | Gray | May 1, 1934 |
| 2,447,126 | Kollman | Aug. 17, 1948 |
| 2,513,630 | Elliott | July 4, 1950 |

FOREIGN PATENTS

| | | |
|---|---|---|
| 519,055 | France | June 4, 1921 |